United States Patent Office.

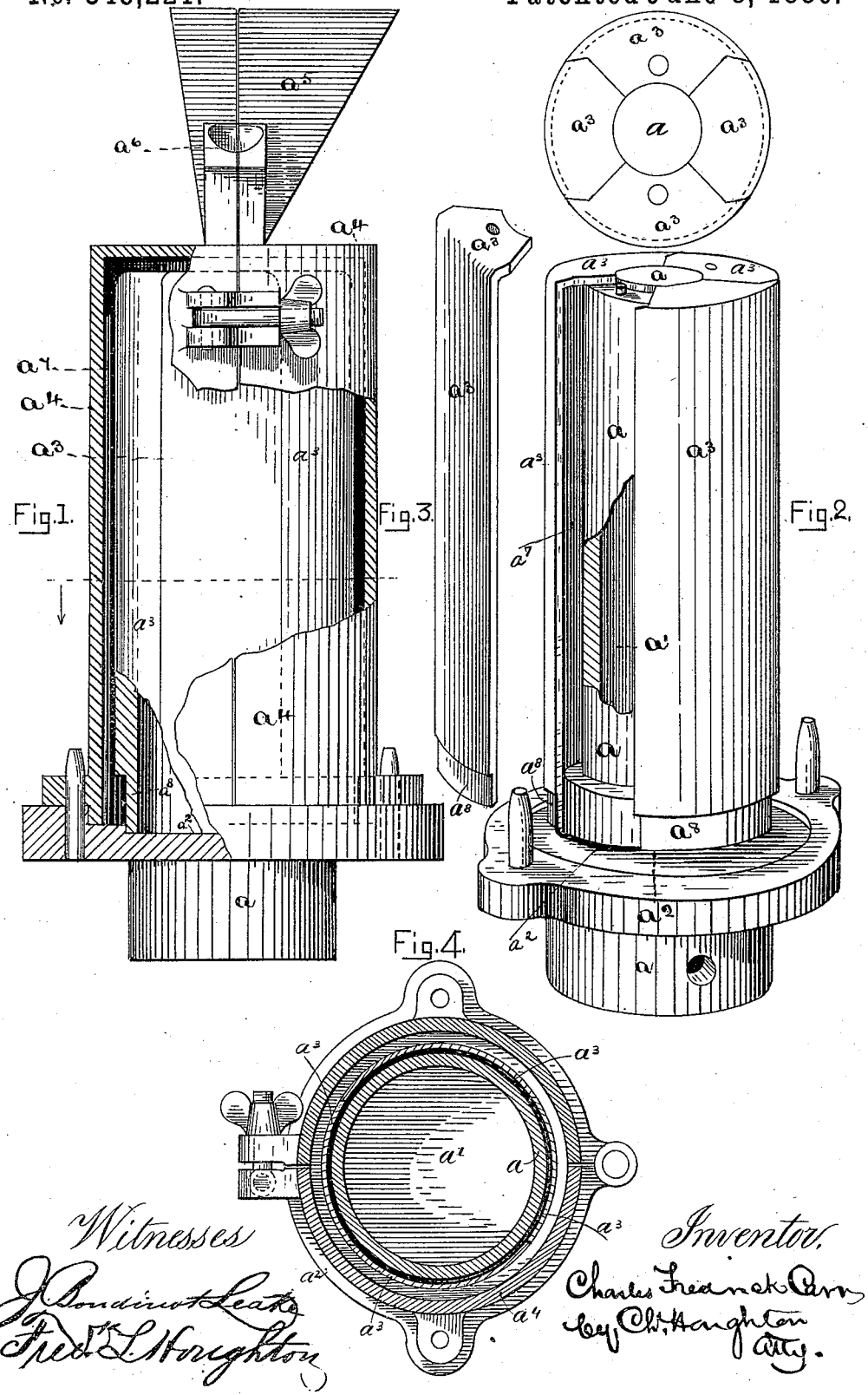

CHARLES FREDRICK CARR, OF WAREHAM, MASSACHUSETTS.

MOLD FOR CASTING TRAPS.

SPECIFICATION forming part of Letters Patent No. 343,221, dated June 8, 1886.

Application filed February 25, 1886. Serial No. 193,134. (No model.)

*To all whom it may concern:*

Be it known that I, CHARLES FREDRICK CARR, of Wareham, in the county of Plymouth, in the Commonwealth of Massachusetts, have invented a new and useful Improvement in Molds for Casting Hollow Cylindrical Vessels of Lead or other Metal, of which the following is a specification.

My invention relates more particularly to molds for casting leaden traps for drainpipes from sinks, bowls, &c., in houses, the object of it being to enable plumbers and others making such traps to produce them with a considerable saving of labor; and it consists in a metallic mold made in the form and manner described below.

To practice my invention, I first provide a metal base, with a vertical opening through its center to receive and sustain and secure the other parts of the mold, and on this, and integral with it over the hole through it, I erect a central standard as high as the mold will be—hollow to save weight of metal and closed at the top—and provided with a shoulder around the top, having dowel-pins on it to secure the inner wall of the mold around it. I make the inner wall of the mold preferably of four pieces or staves as long as the mold, to be put together around and secured to the central standard and base, and which, when so placed and secured, form a cylinder of smooth outer surface closed at the top, and resting in a groove in the base at the bottom, with a rabbet around the bottom, in which a re-enforcing ring is placed before the lead is poured, with a screw-thread in it to receive a correspondingly-threaded cover for the trap when finished. I then make the outer wall of the mold in two pieces, which correspond in form to the form of the inner wall of the mold, but enough larger so that when it is in place over the inner wall there is a space between them, which, when filled with melted lead and cooled, will produce the vessel desired for a trap. The two pieces of this outer wall of the mold are connected on one side by strong hinges and on the other by screw-clamps, which bring them closely together. The lower edge of this outer wall is made to enter into a groove in the base prepared to receive it, and it is provided with a funnel and gate at the top of the mold $a$, through which the melted lead to make the trap is to be poured. The bottom of the trap is cast at the top of the mold. When the lead has been poured and cooled, the position of the mold is reversed, and the base, with the central standard, is lifted away from the mold, disengaging the staves of the inner wall of the mold from the dowel-pins at the top of the central standard and from the grooves in the base-plate, so that they will be readily removed, leaving the inside of the vessel clear; and by releasing the screw-clamps the outer wall of the mold can be opened and the casting is free, and, after cutting off the sprue, is ready for use.

In the drawings annexed, Figure 1 shows a vertical perspective of the mold with a part of the outer shell broken away to show the inner wall of the mold and the space between the outer and the inner walls of the mold where the lead casting is formed. Fig. 2 shows a vertical perspective of the mold with the outer shell off and one of the staves of the inner shell removed, to show the central standard upon and around which the staves forming the inner wall of the mold are secured. Fig. 3 shows one of the staves which make the inner wall of the mold detached. Fig. 4 is a plan sectional of the mold on the line X.

$a$ is the vertical central standard and base of the mold, in one piece, the central standard being hollow, to save weight of metal, and formed to support the inner walls of the mold by a shoulder at the top with dowel-pins on it, the base being adapted to secure the bottom of the inner wall or shell, and also to receive and secure the bottom of the outer wall or shell, of the mold.

$a'$ shows the cavity in the central standard, which is hollow.

$a^2$ is a circular groove in the base around the bottom of the vertical central standard, into which the lower end of the inner wall enters, and by which it is secured in place.

$a^3$ is the inner wall of the mold, which, when in place, is a cylinder closed at the top, and the bottom entering the groove $a^2$. It is made in four pieces, which I call "staves," the lower ends of which are so shaped as to enter and fill the groove $a^2$, and the top ends are shaped and bent to rest upon and cover the shoulder made to receive them at the top of the central standard, two of them provided with holes to match and go onto two dowel-pins on the shoulders, and so formed at the shoulder as to lock the other two staves in their place, the two dowel-pins thus securing all four of the staves forming the inner wall of the mold at the top. When these staves are in place, they form a cylinder with a smooth outer surface, which is the inner wall of the mold. At the lower end, on the outside of the cylinder, is a groove or rabbet around it, in which a brass screw-threaded ring, which is to be joined to and become a part of the vessel to be cast in the mold, is placed, so that the flowing melted metal will run against and around it and be soldered to it.

$a^4$ is the outer wall of the mold, cylindrical in form, made in two vertical pieces hinged together on one side, and secured on the opposite side by a screw-clamp of suitable form. The inside of this outer wall gives shape to the outer surface of the vessel cast in it. The lower edge of this outer wall sits into a groove in the base made to receive it and fit it closely, and ears with holes through them to go onto the vertical dowel-pins on the base.

$a^5$ is the gate through which the melted metal is poured into the mold. It consists of a vertical projection cast on the top of one of the pieces forming the outer wall of the mold, in which is a funnel-shaped cavity to receive the melted metal, having an opening at the bottom of it, into the space between the outer and inner walls of the mold in which the casting is to be formed.

$a^6$ is an opening for the escape of air from the mold when metal is poured in. This is made in form of a projection on one side of the mold, corresponding with a similar projection on the opposite side, by which the outer shell may be lifted off the mold.

$a^7$ is the space between the outer and inner walls of the mold, which the melted metal flows into and fills and makes the vessel.

$a^8$ is the groove or rabbet in which a metallic screw-threaded ring is set when the mold is ready for casting, into which a cover for the vessel cast, suitably made and threaded, will enter. This screw-ring becomes a part of the vessel cast, and is not a part of the mold, and is not shown in the drawings.

It is obvious that all the parts of this mold will be made of brass or other suitable metal.

I claim as new and my invention—

1. The above-described improved mold for casting traps, consisting of the outer wall, $a^4$, the inner wall, $a^3$, the central standard, and base $a$, all substantially as described, for the purpose specified.

2. In a mold for casting traps, in combination, the standard and base $a$, the outer wall, $a^4$, the gate $a^5$, the air-escape $a^6$, and the inner wall, $a^3$, all made substantially as described.

CHARLES FREDRICK CARR.

Witnesses:
W. L. CHIPMAN,
JOHN H. GRIFFIN.